(12) United States Patent
Lee

(10) Patent No.: US 6,890,235 B2
(45) Date of Patent: May 10, 2005

(54) METHOD FOR MANUFACTURING A MULTI-TUBE FLUORESCENT DISCHARGE LAMP

(76) Inventor: Wen-Tsao Lee, No. 10-17, Shiaufenlin, Dalin Tsuen, Bei Pu, Hsinchu 314 (TW)

( * ) Notice: Subject to any disclaimer, the term of this patent is extended or adjusted under 35 U.S.C. 154(b) by 459 days.

(21) Appl. No.: 09/681,525

(22) Filed: Apr. 23, 2001

(65) Prior Publication Data

US 2001/0046827 A1 Nov. 29, 2001

(30) Foreign Application Priority Data

Apr. 25, 2000 (TW) .......................................... 89107730

(51) Int. Cl.$^7$ ............................................. H05B 33/10
(52) U.S. Cl. ............................. 445/26; 445/22; 445/23; 445/24; 445/25; 313/490; 313/491
(58) Field of Search ....................... 445/22, 23, 24, 445/25, 26, 39, 58, 40, 43, 41, 27; 313/490, 318, 491, 489, 42, 623, 178, 635

(56) References Cited

U.S. PATENT DOCUMENTS

| | | | | |
|---|---|---|---|---|
| 3,898,511 A | * | 8/1975 | Johnson et al. | |
| 3,984,590 A | * | 10/1976 | Mason et al. | |
| 4,225,905 A | * | 9/1980 | Moriyama et al. | |
| 5,105,119 A | * | 4/1992 | Dayton | |
| 5,108,333 A | * | 4/1992 | Heider et al. | |
| 5,599,368 A | * | 2/1997 | Bernicke et al. | |
| 5,924,904 A | * | 7/1999 | Fujii et al. | |
| 5,982,088 A | * | 11/1999 | Hamada et al. | |

* cited by examiner

Primary Examiner—Dean A. Reichard
Assistant Examiner—Nguyen T. Ha

(57) ABSTRACT

A method of manufacturing a multi-tube fluorescent discharge lamp which construct multiple glass tubes of different caliber in coaxial structure, the both sides of the inner most tube are connected to a cathode respectively, by isolating, perforating and blocking the discharge path, forming a successive discharge path, and coating phosphor on surface of the discharge tubes. The invention can then have more fluorescent area than a conventional fluorescent lamp of the similar size and higher lumen as well as power transfer factor. Compared with the power consumption of a conventional fluorescent discharge lamp, the invention therefore has higher luminous flux.

11 Claims, 19 Drawing Sheets

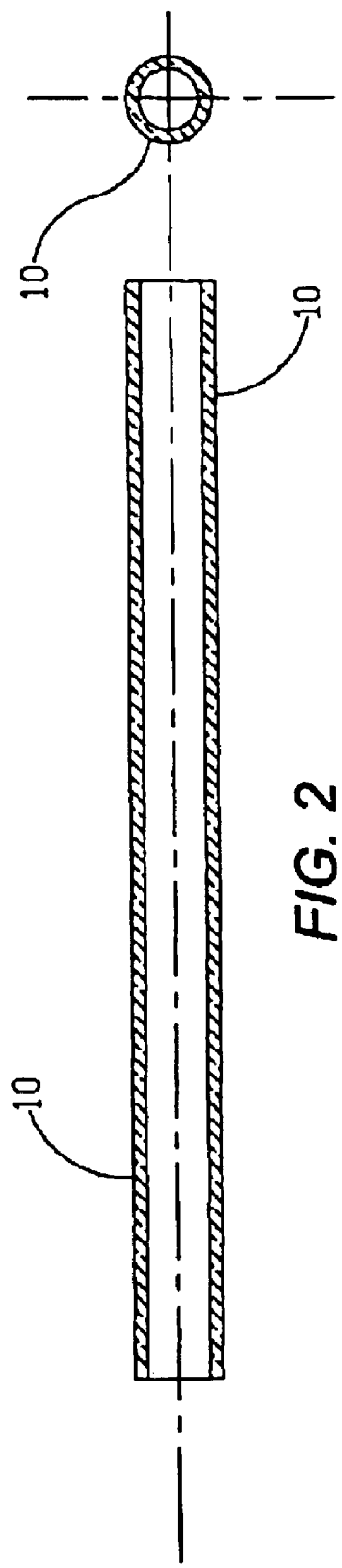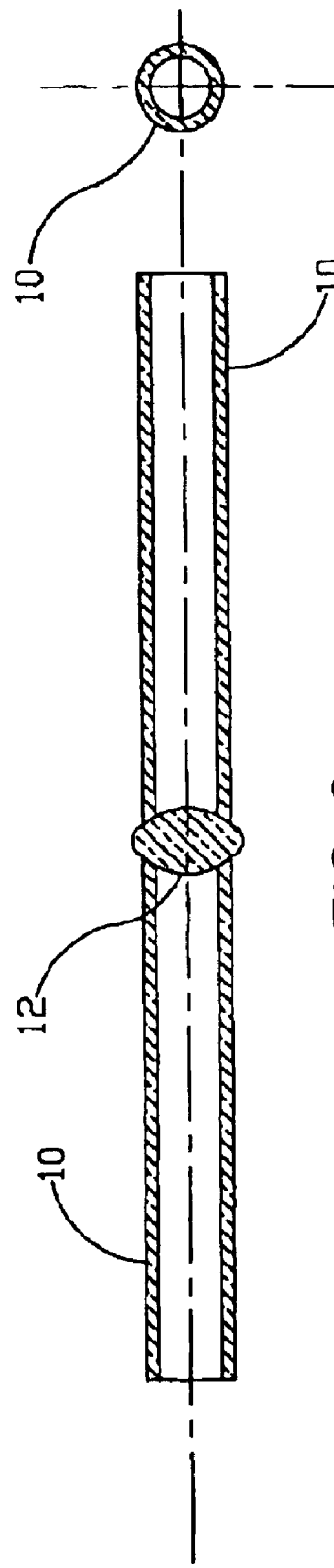

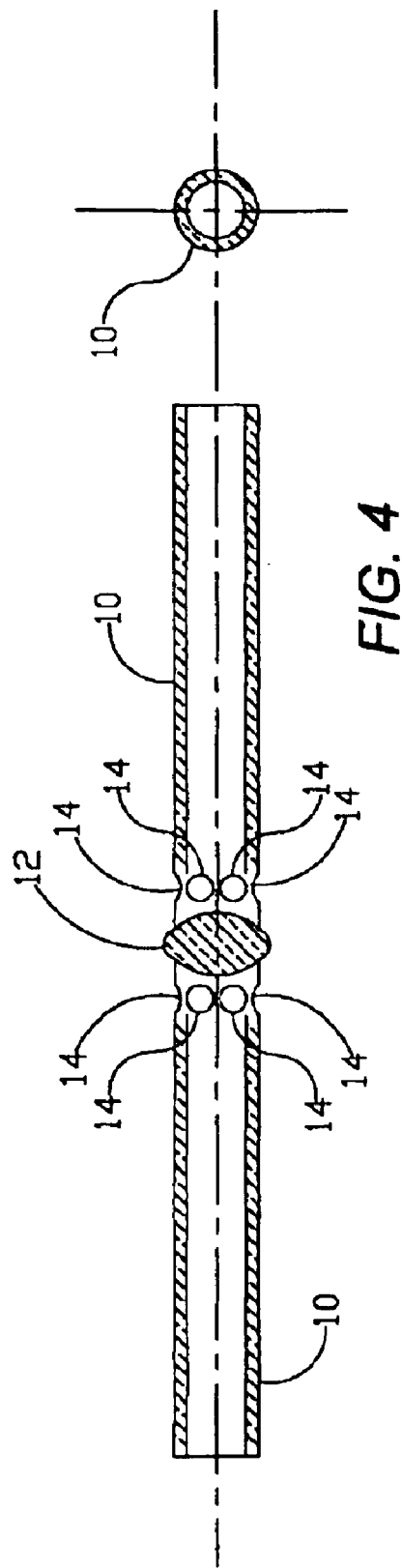
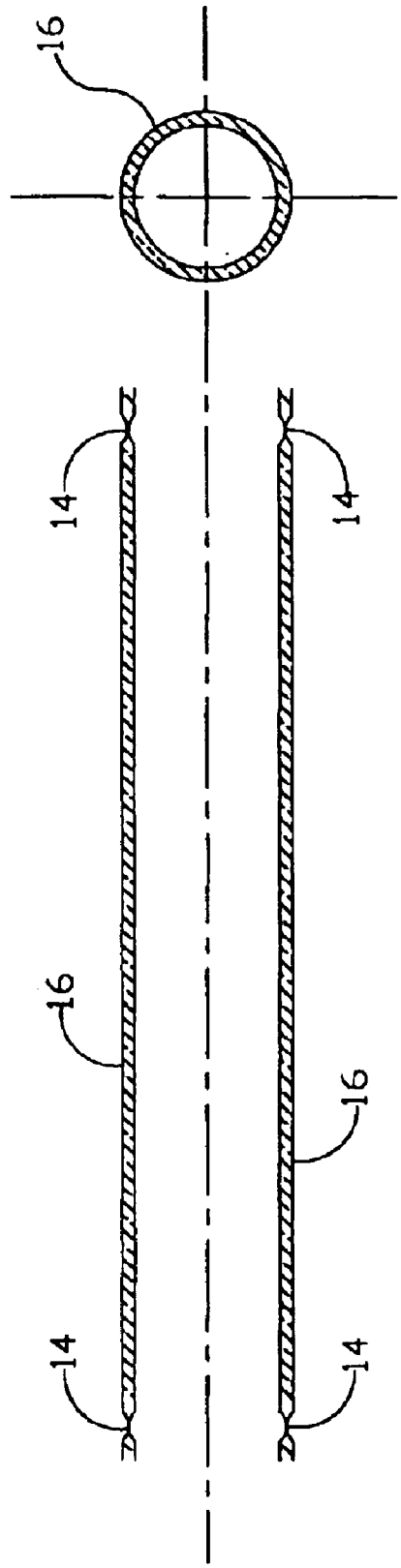

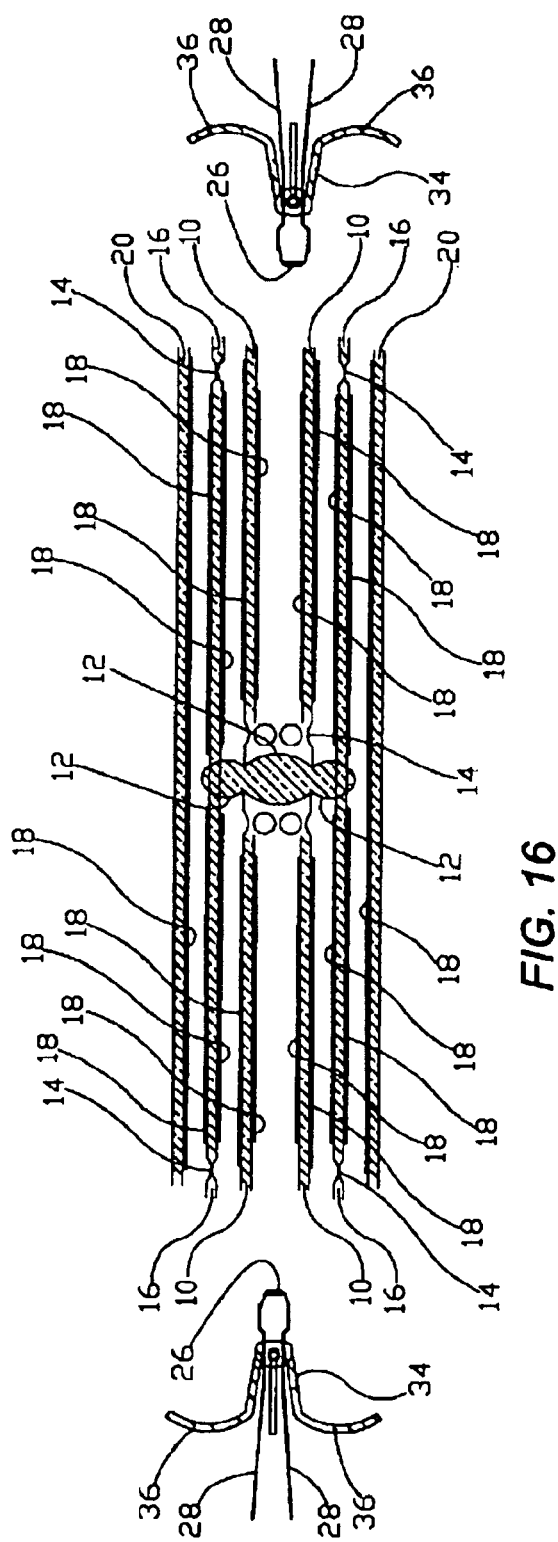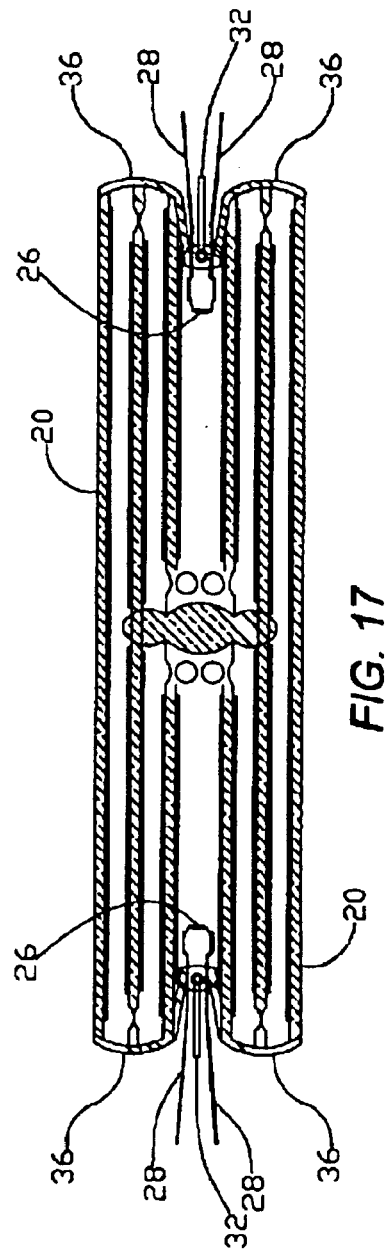

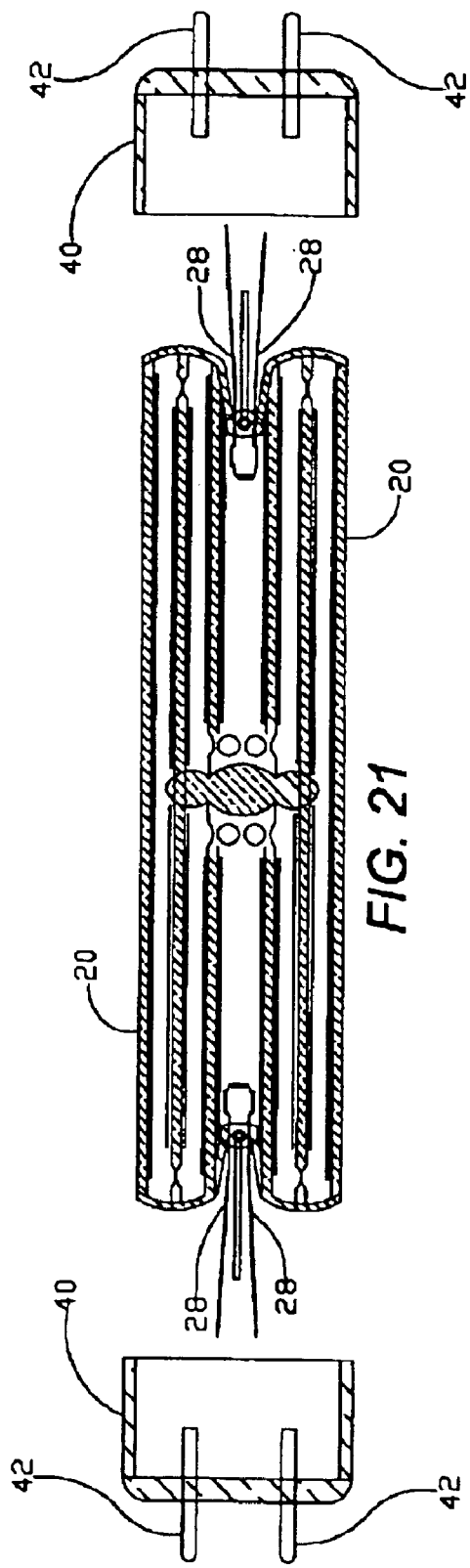
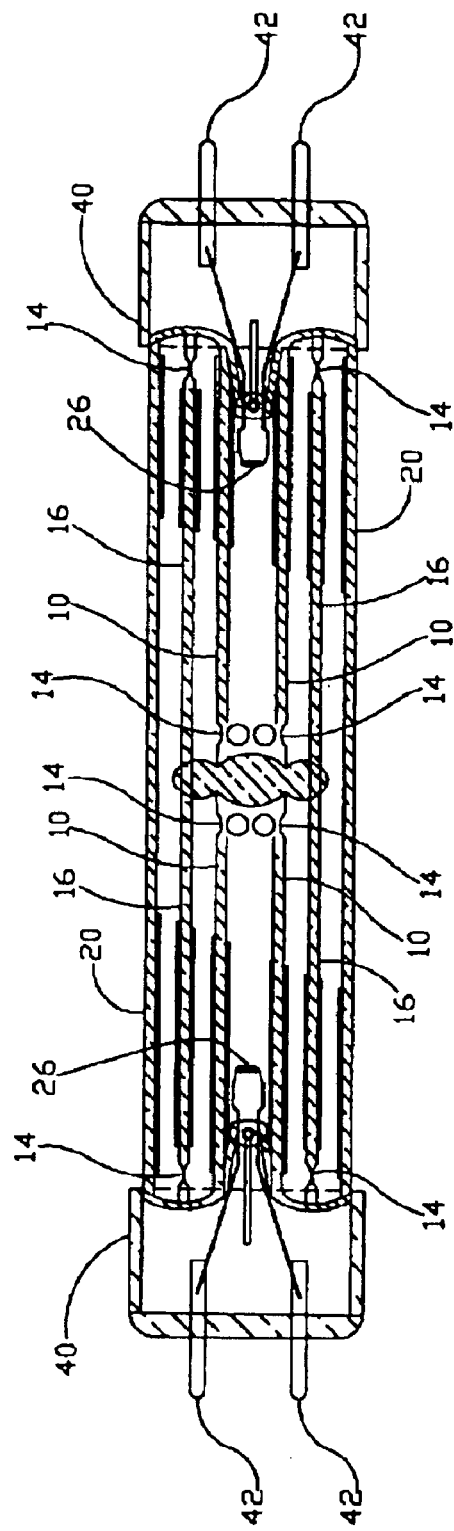
FIG. 21                    FIG. 22

METHOD FOR MANUFACTURING A MULTI-TUBE FLUORESCENT DISCHARGE LAMP

BACKGROUND OF THE INVENTION

1. Field of the Invention

The Invention relates to fluorescent discharge lamps, and more particularly, to a method for a multi-tube fluorescent discharge lamps which construct multiple glass tubes of different caliber in coaxial structure, Both ends of the inner most tube are connected to a cathode respectively. By isolating, perforating and blocking the discharge path, to form a succession of interconnected discharge chambers, and coating fluorescent material on surface of the discharge tubes. Such an Invention can then have more fluorescent area than a conventional fluorescent lamp of similar size and have higher lumen as well as power conversion efficiency. By comparing with the power consumption of a conventional fluorescent discharge lamp, it is therefore has higher luminous flux.

2. Description of the Prior Art

A conventional fluorescent discharge lamp generally is straight or circular tube type. In order to minimize the size and increase luminosity, straight-shaped tube is bent into a wreath or U type for thin tube. Even in some cases, couples of short straight fluorescent tubes are aligned and connected in parallel, on both ends of the tube, it is connected with a cathode tungsten filament coated with oxide such as Ba, Sr and Ca. In the discharge tube, it is in a state of vacuum and with little Hg and Ar to facilitate the discharge process.

The cross-section of conventional fluorescent lamp tubes is usually a round shape and only one layer of fluorescent material such as phosphor is coated on the surface of the tube inside. When the cathodes on both ends of the tube are triggered by current and high-voltage power is applied electrons are released from the two cathodes, causing the tube glows and discharges. The gaseous Ar and Hg molecules are also stimulated to form plasma. Its ions and ultraviolet rays also impact the phosphor. The light is coming from conversion of energy potential.

Because cross-section area of a round tube is larger than that of any shape, the average density of electronic flux inside is lower than in other kinds. Furthermore, the electronic flux on the discharge path is concentrated nearby the axis of the discharge tube, whereas the density of the electronic flux nearby the surface of the discharge tube inside is low.

Therefore, the luminous flux in a round tube can not be enhanced proportionally by increasing the diameter to expand the area of phosphor. Much of energy nearby the axis in the discharge tube will be depleted and converted into heat and the conversion factor of the lumen (Lm) and Watt (W) insufficient.

Although there is another kind of lamp with lots of segmented built-in tubes and coated with phosphor to increase the luminous fluorescent area, but it does not form a succession of interconnected discharge path. Therefore, neither a stable discharge path or equable plasma status is not guaranteed, nor an adequate and complete luminescent of fluorescent layers is excited in the discharge tube, because the discharge path in takes the shortest distance.

Moreover, due to the narrow spectrum of conventional fluorescent discharge lamp, the color-rendering index (Ra) is low and the color temperature (K) is a bit high causing the illuminated object unable to reveal its colors. In addition because the cathode on both-ends of the conventional fluorescent discharge lamp is hit by electrons, the tungsten filament is then vaporized to become black and it pollutes the fluorescent layer of the tube, luminous efficiency of the fluorescent layer as well as the life cycle of the fluorescent discharge lamp.

SUMMARY OF THE INVENTION

This Invention is a multi-tube fluorescent discharge lamp; the design concept of the Invention is made of multiple discharge glass tubes of different calibers in a coaxial structure. By isolating, perforating and blocking the discharge path, and applying phosphor on the surface of the discharge tubes, this creates a thin and transparent film of fluorescent coating, allowing the light of the inner tubes to pass through each of the coatings to the outside of the lamp. In addition, a pair of hot or cold cathodes helps the electronic flux in the vacuum accelerate and hit the Hg molecule, which then create plasma. The coating of the fluorescent on the inner layer surface of the discharge tube is hit by electron ion and emit light. Under the same power rate and with the same lamp volume, the tubes of the multi-tube fluorescent discharge lamp aligned in a coaxial structure have a smaller cross-section area than that of a conventional fluorescent discharge lamp to allow higher density of electron flux to pass through the discharge path in the tubes. Therefore, the high-density electron ion has better stimulating effects on the fluorescent coating and the luminous fluorescent area is larger than conventional fluorescent discharge lamp, both of these advantages increase the luminous flux.

Compared to conventional fluorescent discharge lamp of the same power rate, this Invention is characterized by higher luminance, lower consumption of electric and lower heat rate. Moreover, because the electric flux of the Invention is less than that of a conventional fluorescent discharge lamp, the vaporization caused by electric flux hitting the cathode is slower and the life cycle of the cathode is longer than that of conventional fluorescent discharge lamps. It is also feasible to apply a ringed cathode to increase the surface area of the hitting electron flux and then disperse the hitting, so that the oxide material on the surface of the cathode can be protected from rapid consumption. In this way, multi-tube fluorescent discharge lamp can outlive conventional fluorescent discharge lamps.

A multi-tube fluorescent discharge lamp with a coated surface of various fluorescent materials has different color temperatures. The fluorescent material, when stimulated, can release different spectrum and create special colors after mixing. Alternatively it can include a wider spectrum to improve the color temperature (K) as well as color-rendering index (Ra) to be close to the sun's spectrum.

The multi-tube fluorescent discharge lamp is designed with coaxial structure, aiming to achieve special color luminance or a balanced spectrum range of light by way of filtering the luminance released from the transparent discharge glass tube of different colors.

The characteristics of this Invention can be specifically presented by the following detailed figures.

BRIEF DESCRIPTION OF DRAWINGS

FIG. 2 to FIG. 9 are cross-sectional views and end views showing a step-by-step process of fabrication of a three-tube fluorescent discharge lamp of a first embodiment.

FIG. 16 and FIG. 17 are cross-sectional view to follow the FIG. 9 showing a step-by-step process of fabrication of the three-tube fluorescent discharge lamp of the first embodiment.

FIG. 21 is a cross-sectional view of the three-tube fluorescent discharge lamp of the first embodiment showing a pair of bases unattached.

FIG. 22 is a cross-sectional view of the full schematic three-tube fluorescent discharge lamp of the first embodiment.

DETAILED DESCRIPTION

Figure 1:
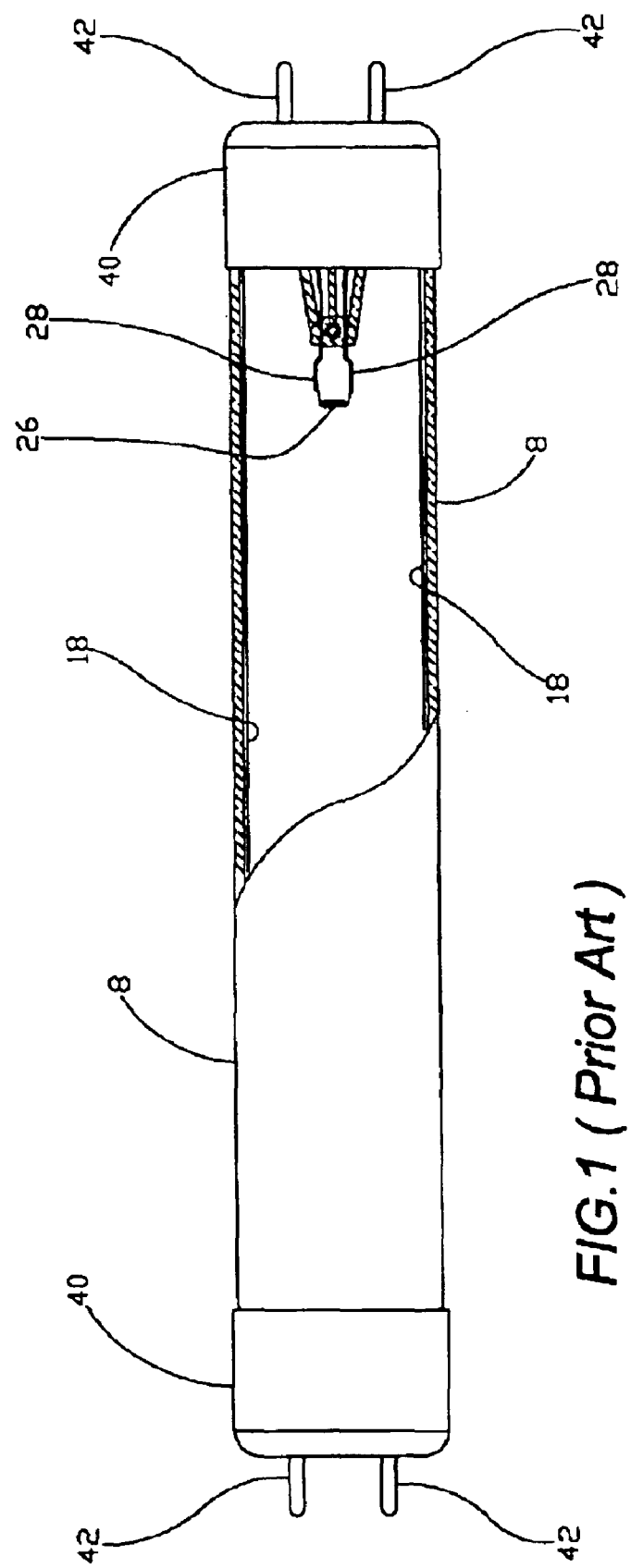
FIG. 1 is a partly broken side view of a conventional fluorescent discharge lamp.

According to FIG. 1, illustrates a conventional fluorescent discharge lamp. The discharge tube 8 is a straight glass tube. One cathodes 26, with its electrode 28 connected to the terminal 42 on the tube base 40, is located at each end of the tube. The figure shows clearly that there is only one phosphor layer 18 on the inside surface of the tube. In addition, because the density of electronic flux is higher at the axis of the discharge tube than at the phosphor layer 18 on the inside surface, much of the energy around the axis in the discharge tube will be wastefully converted into heat. Therefore, the power conversion factor of the lumen leaves some room for improvement.

According to FIG. 2, the first tube 10 is a round straight glass tube positioned at the innermost part of the multi-tube fluorescent discharge lamp. It is where the cathodes 26 as shown in FIG. 1 are to be inserted.

According to FIG. 3, toward the middle of the first tube 10, the glass is softened by heating with a flame of gas and oxygen or by means of an arc heating. It is twisted at the softened middle part by turning around the two ends of the tube in mutually reverse direction. Thus an isolator 12 is formed, and the pipeline of the tube is blocked at the middle, insulating and separating the discharge path of the first tube 10 into two discharge chambers.

According to FIG. 4, air is blown into the first tube 10 from both ends, and heating is performed at several points around the two sides of the isolator 12. This way, the plural-numbered through-holes 14 are formed.

According to FIG. 5, the second tube 16 is a round straight glass tube diameter is slightly larger than that of the first tube 10. One end of the second tube 16 is air tight, and air is blown in either from the other end, or from both ends. Also, heating is performed at several spots around both ends of the tube, and the plural-numbered through-holes 14 are formed.

Figure 6:
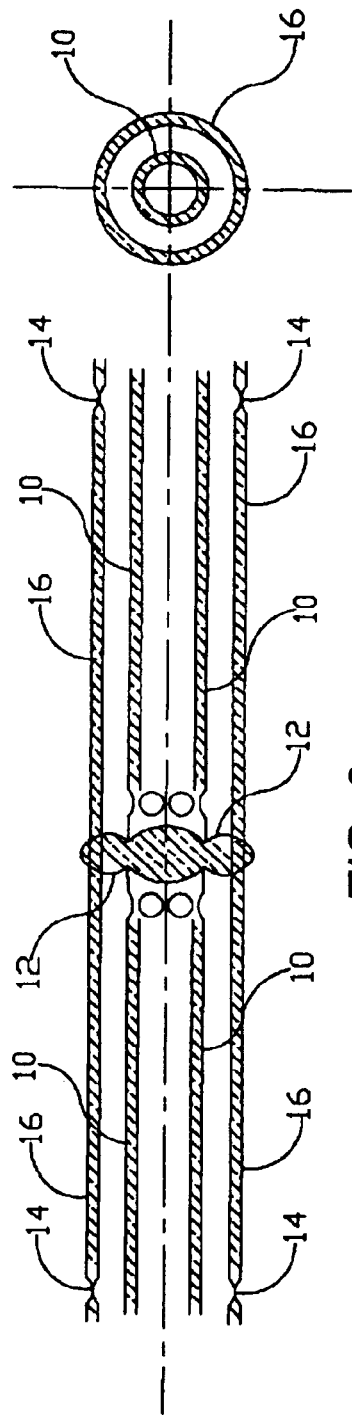

According to FIG. 6, the first tube 10 is slid into the second tube 16 to form a coaxial structure. Heating is performed around the second tube 16, at a place that corresponds to the position of the isolator 12 in the first tube 10, and then rotation is made at both ends of the second tube 16 in mutually reverse direction. This way, the heated, softened middle part of the tube is fused with first tube 10 into another isolator 12 that blocks the pipeline of the second tube 16 and separating the discharge path of the second tube 16 into two discharge chambers.

Figure 7:
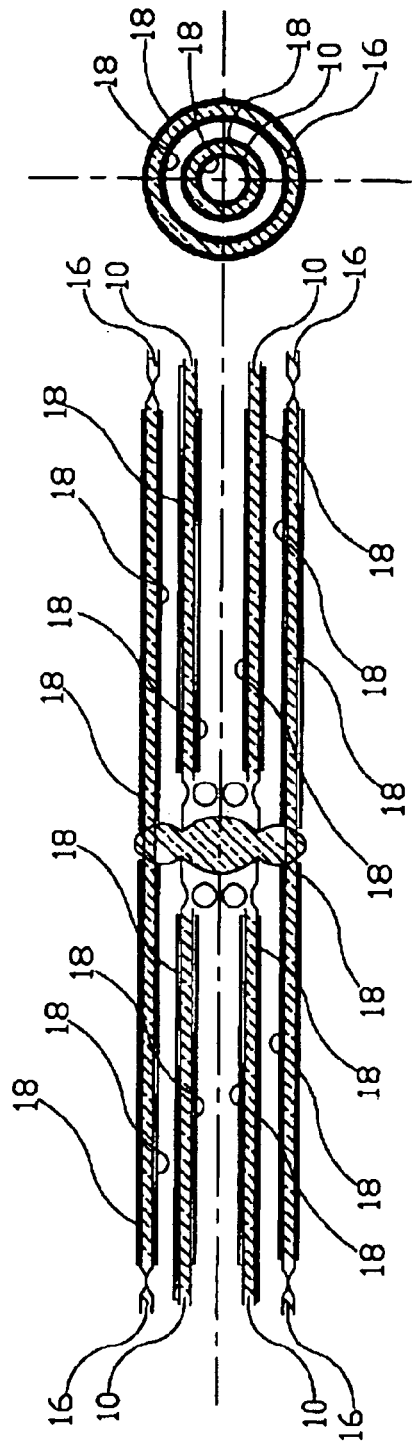

FIG. 7 demonstrates how the inner and outer surface of the first tube 10 and the second tube 16 are coated with the phosphor layer 18.

Figure 8:
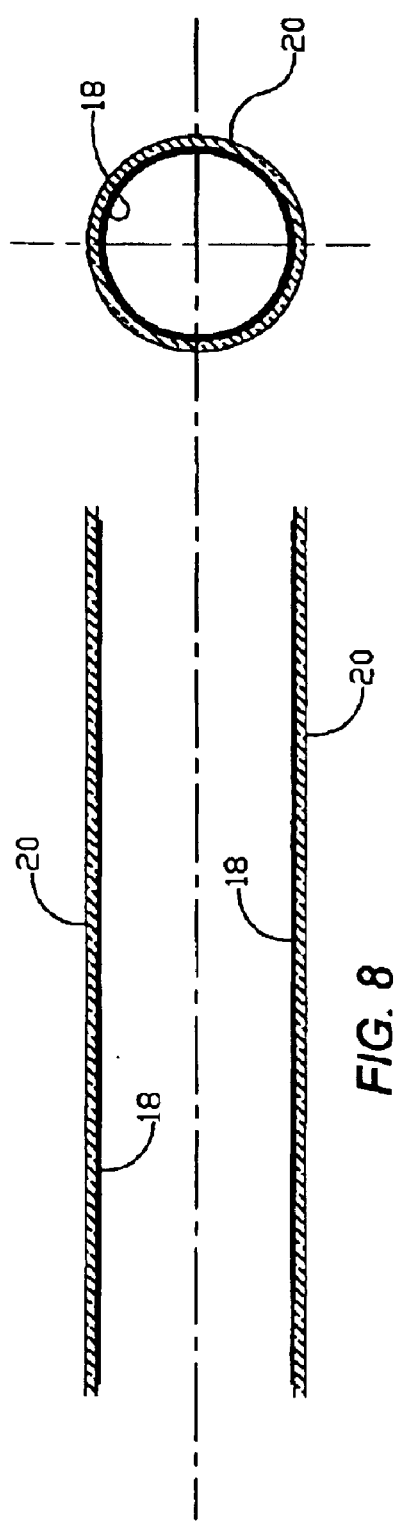

According to FIG. 8, the third tube 20 is a round straight glass tube whose diameter is slightly larger than that of the second tube 16, and the phosphor layer 18 is coated on the inner layer surface of the third tube 20.

Figure 9:
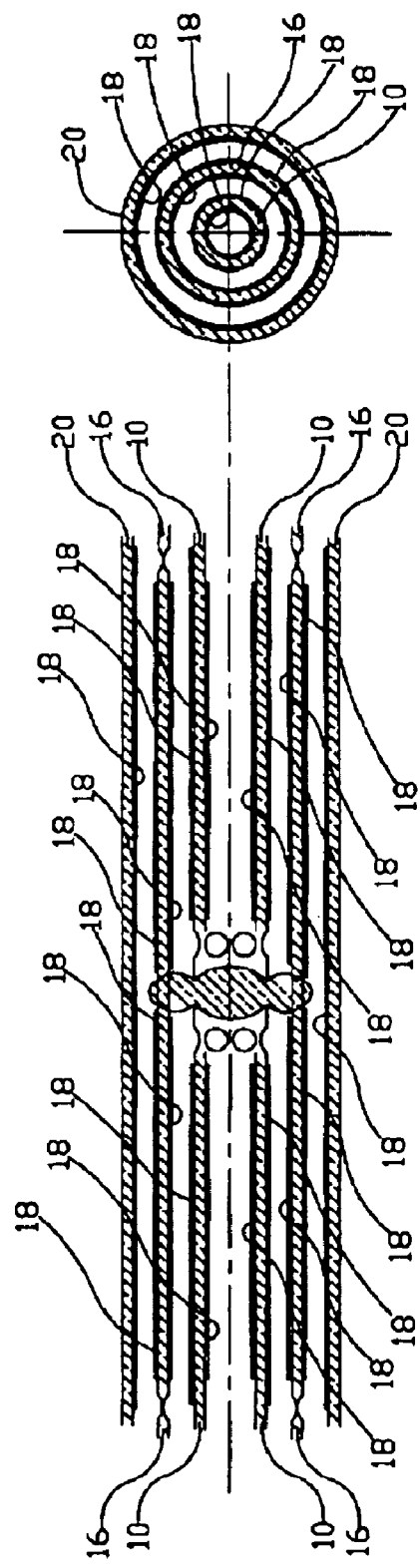

According to FIG. 9, the assembly of the first tube 10 and the second tube 16 is inserted into the third tube 20 to form a coaxial structure.

Figure 10:
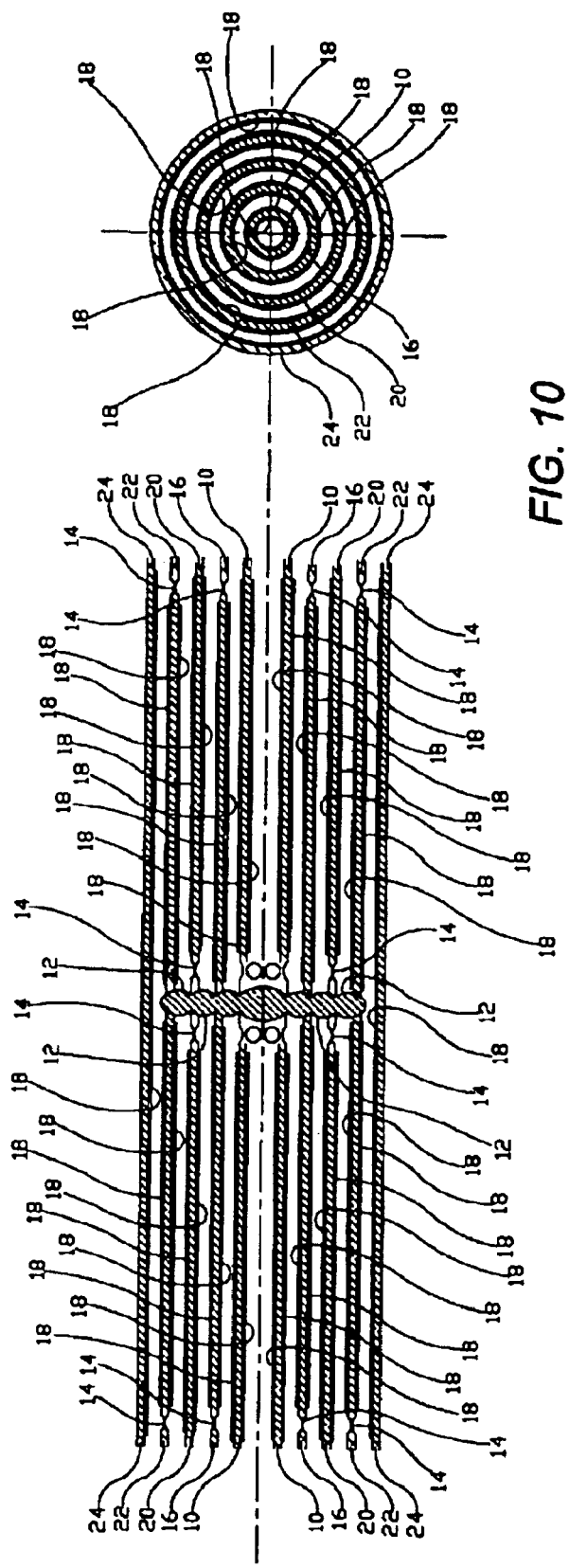
FIG. 10 is a cross-sectional view and end view of the five-tube combination with phosphor of a second embodiment.

According to FIG. 10 and refer to FIG. 6. After the assembly of the first tube 10 and the second tube 16 is slid into the third tube 20 to form a coaxial structures, the third tube 20, with its diameter slightly larger than that of the second tube 16, is heated around a site that corresponds to the isolator 12 of the second tube 16. Then, rotation is performed at both ends of the third tube 20 in mutually reverse direction, and the softened part of the third tube 20 is fused with the isolator 12 of the second tube 16 into another isolator 12 that blocks the pipeline of the third tube 20 and separate the discharge path of the third tube 20. Next, air is allowed in from both ends of the third tube 20, heating is performed on the third tube 20 around several points at both side of the isolator 12 of the second tube 16, and the plural-numbered through-hole 14 are formed.

The assembly Also, with a glass tube of the fourth tube 22, which the diameter is slightly larger than that of the third tube 20, to slide into the combination of the first tube 10, the second tube 16, and the third tube 20, is then slid into the fourth glass tube 22, one with a diameter slightly larger than that of the third tube 20 to form a coaxial structure. heating Heating is also performed on the circumference of the fourth tube 22 around the area that approaches approach to the isolator 12 of the third tube 20. The two at both ends of the fourth tube 22 are turned around in mutually is rotated in reverse direction, and the softened part twisted at the softening place of the fourth tube 22 for fusing is twisted and fused with the isolator 12 of the third tube 20 for connecting and forming an into another isolator 12 that blocks the pipeline of the fourth tube 22 to seal the pipeline and divides the discharge path of the fourth tube 22 separating the discharge path of the fourth tube 22, thus forming into two discharge chambers so that air can be blown in from both ends of the fourth tube 22. Moreover, heating is performed on the circumference to approach around several spots at both ends of the fourth tube 22 and at the position of plural number, thus extruding producing plural-numbered through-holes 14 with plural.

The phosphor layer 18 is formed on both the inside and outside surfaces of the assembly of the first tube 10, the second tube 16, the third tube 20 and the fourth tube 22. It can also be found on the inside surface of the fifth tube 24. The assembly of the first tube 10, the second tube 16, the third tube 20 and the fourth tube 22, is to be inserted into the fifth tube 24 to form a coaxial structure.

Figure 11:
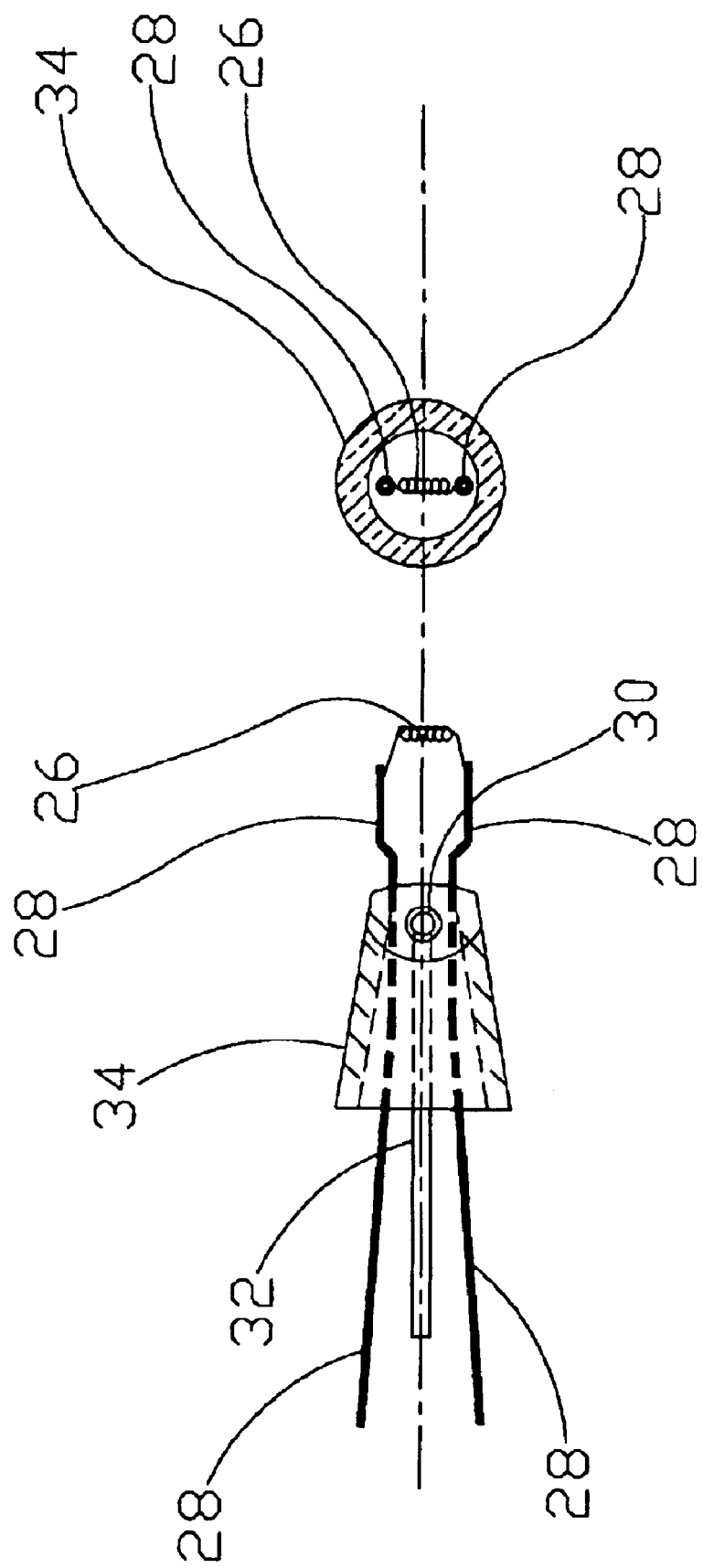
FIG. 11 is a cross-sectional view and end view of an electrode portion with a straight cathode.

According to FIG. 11, the stem 34 is a hollow conical glass post with two ends of different diameters. Its smaller end can seal and fix the electrode 28, which is attached to a straight cathode 26. The pipe 32 is connected with the stem 34 and its opening hole 30 is located at the sealed end of the electrode 28 and allows exhaust to pass through the pipe 32.

Figure 12:
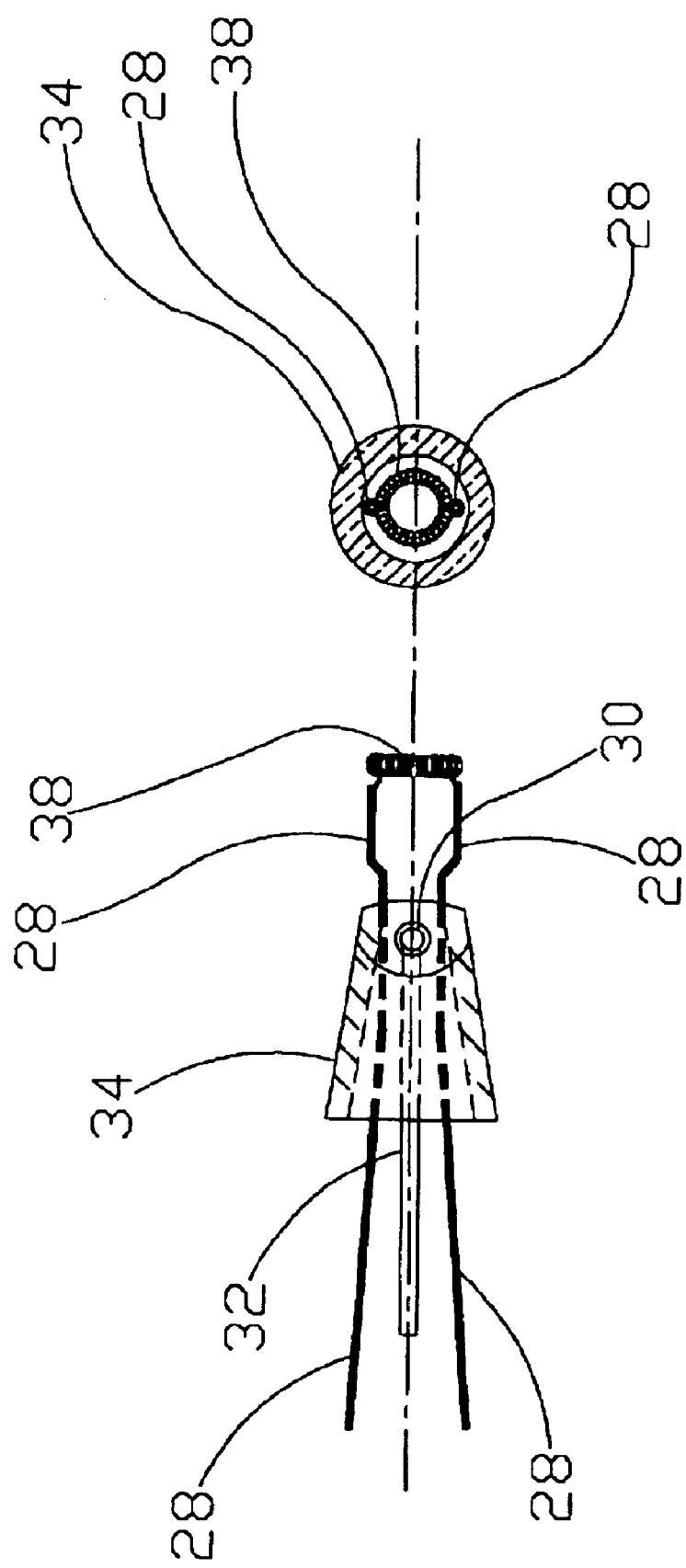
FIG. 12 is a cross-sectional view and end view of an electrode portion with a ring cathode.

According to FIG. 12, and refer to FIG. 11. The electrodes 28 is connected with a ring cathode 38.

Figure 13:
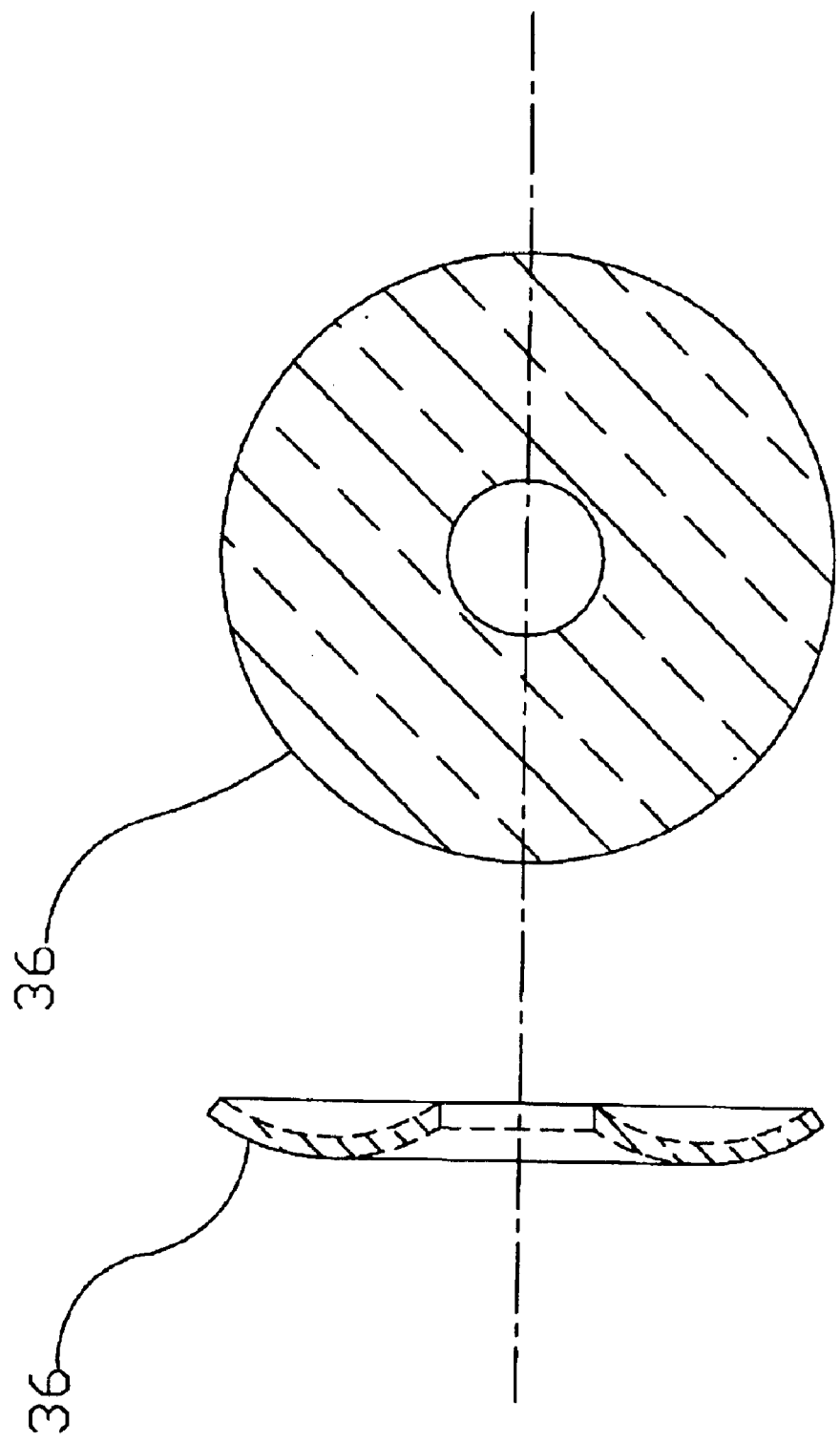
FIG. 13 is a cross-sectional view and end view of a cap.

According to FIG. 13, the inner diameter of the cap 36 is same as the outer diameter of the first tube 10, and the outer diameter of cap 36 is identical to the diameter of the outermost discharge tube.

Figure 14:
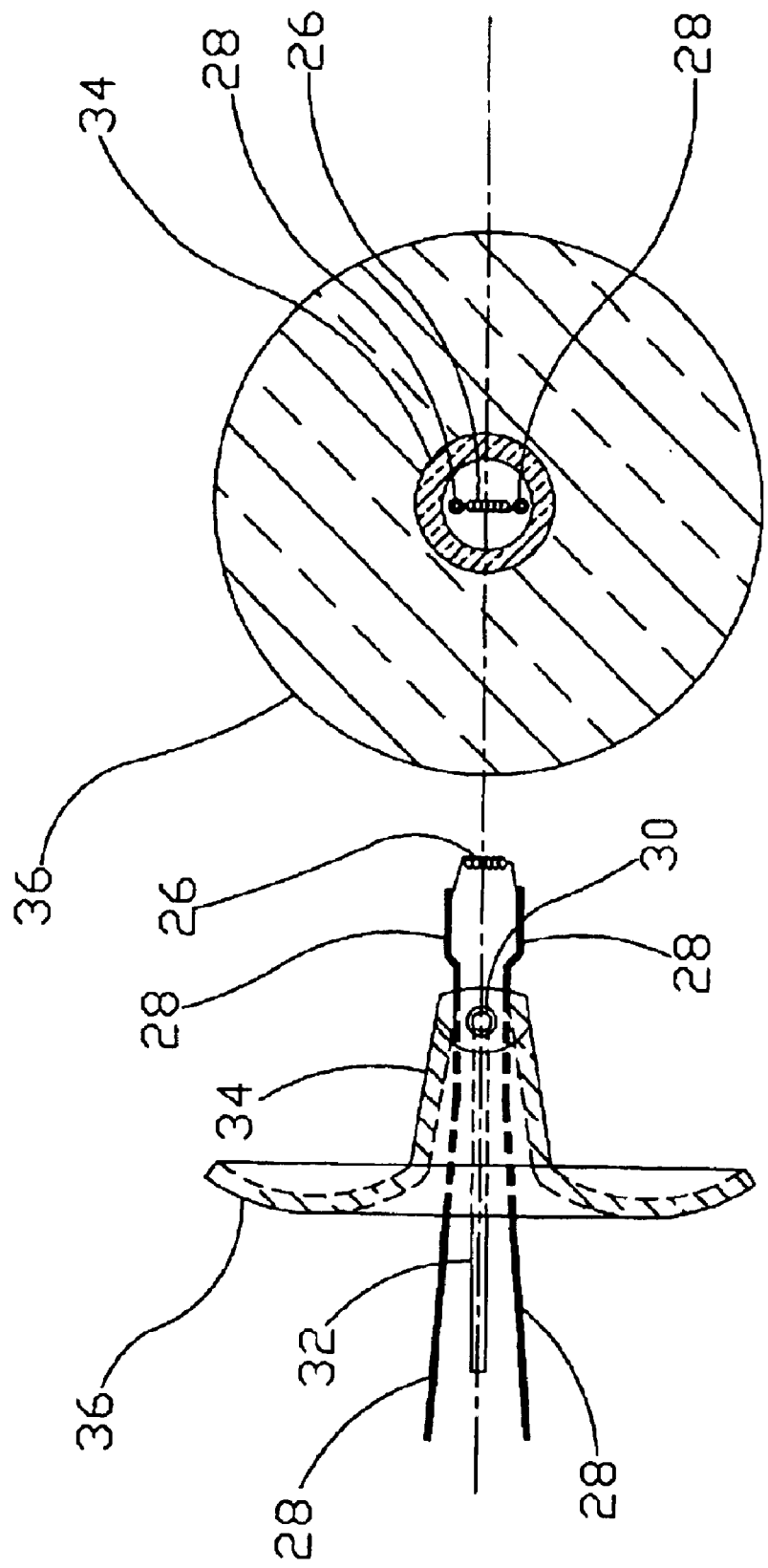
FIG. 14 is a cross-sectional view and end view of a cap combined an electrode portion with a straight cathode.

According to FIG. 14, the structure of the stem is the same as that illustrated in FIG. 11, but the larger end of the conical glass post is connected with the cap 36, the outer diameter of which is identical to the diameter of the outermost tube of the multi-tube fluorescent discharge lamp.

Figure 15:
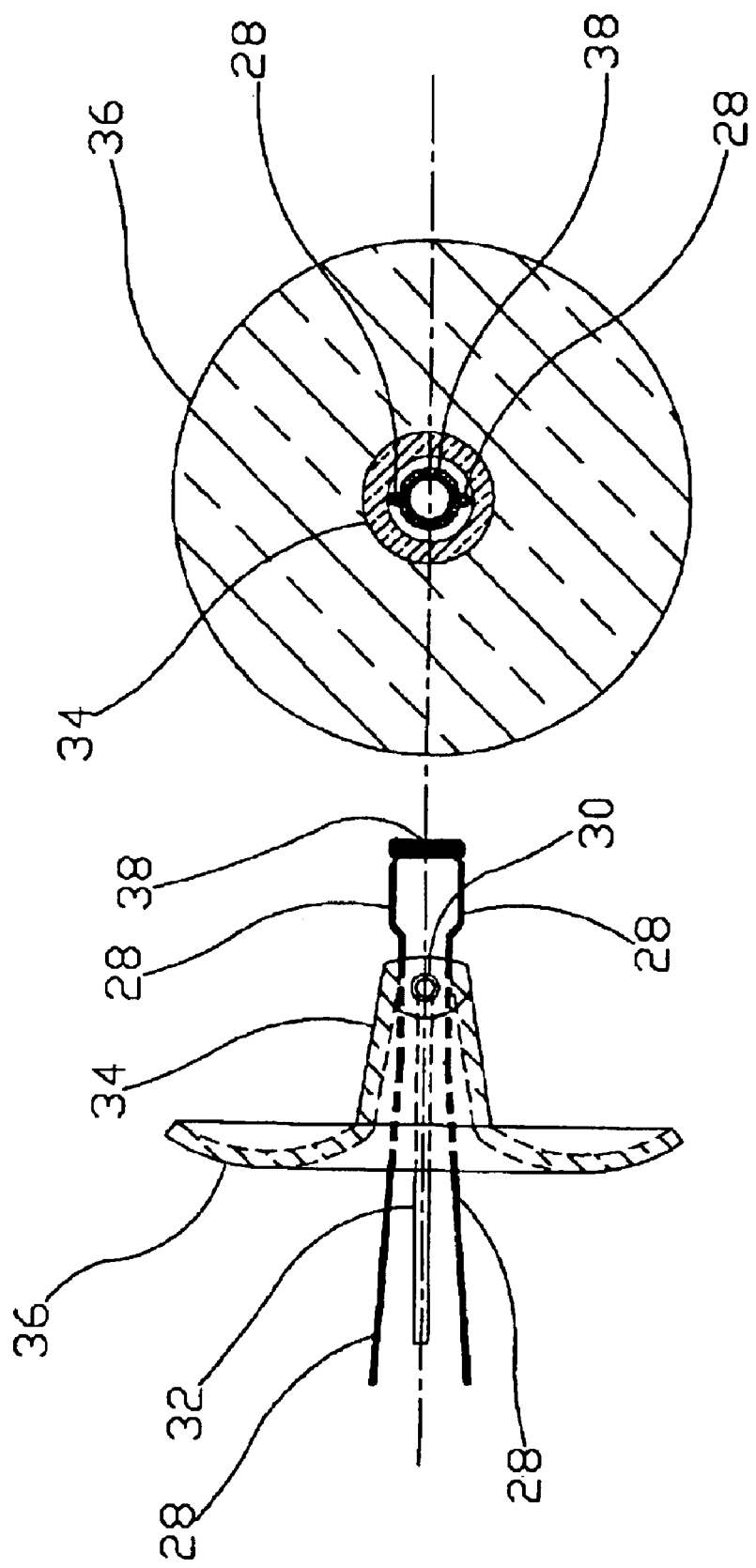
FIG. 15 is a cross-sectional view and end view of a cap combined an electrode portion with a ring cathode.

Compare FIG. 15 with FIG. 14. The structure is identical, but the electrode 28 in FIG. 15 is connected with the cathode 38.

Take a look at FIG. 16 and FIG. 9. FIG. 16 also has a pair of stems 34, which includes a cathode 26 and the paired electrode 28, and which connects with a cap 36. The said cathode 26 is assembled in each of the two discharge chamber of the first tube 10. The outer diameter of the cap 36 is the same as that of the third tube 20.

See to FIG. 17 and refer to the FIG. 16. A stem 34 with the cathode 26 is inserted into each of the two discharge chambers of the first tube 10. The outskirts of both ends of all the assembled tubes are heated and melted together, sealing both ends of the tubes.

Alternatively, the cathode 26 with a pair of stems 34 linked with the cap 36 can be slid into each of the two discharge chambers of the first tube 10. Heating is performed on the cap 36, which is attached to the ends of all the tubes, so the two ends of all the tubes can be melted together and sealed. The sealing of the ends of all discharge tubes, together with the isolator 12 and the through-holes 14 of the first tube 10 and the second tube 16, forms a succession of interconnected discharge chambers.

Figure 18:
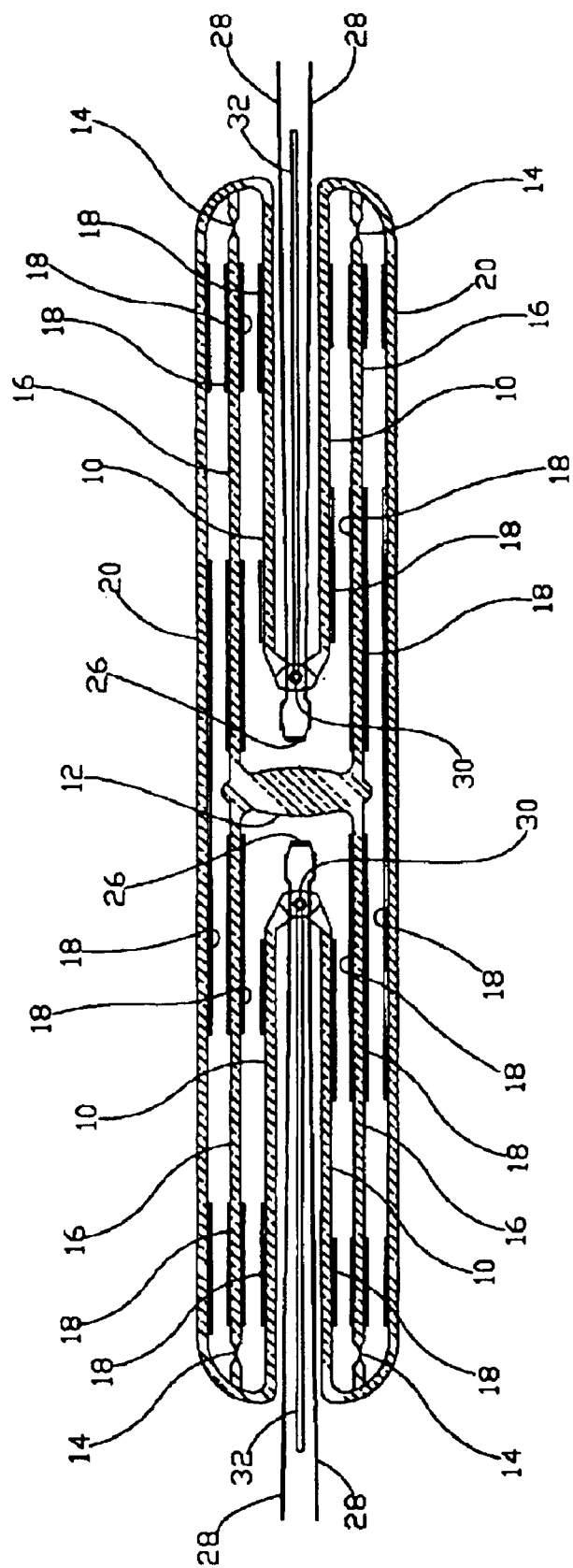
FIG. 18 is a cross-sectional view of a three-tube fluorescent discharge lamp of a third embodiment.

According to FIG. 18, the first tube 10 is a round straight glass tube, in which a pair of electrodes 28 and one pipe 32 with the said tube are inserted to form a coaxial structure. One end of the first tube is heating for softening, and then clamped, pressed and sealed. The pair of electrodes 28 and the pipe 32 can be fixed, and air is blown into the pipe 32. By heating the sealed end, a hole 30 can be produced for exhaust to pass through the pipe 32. A phosphor layer 18 is applied on the outside surface of the said tube, and the cathode 26 is installed onto the pair of electrodes 28. At the other end of the assembly, the same process is to be performed on the other first tube 10.

The second tube 16 is a round straight glass tube with a diameter slightly larger than that of the first tube 10. Air is blown in from both ends of the second tube 16, or one end of the said tube is air tight and air is blown in from the other end. Heating is preformed around several spots on both ends of the second tube 16, thus producing the plural-numbered through-holes 14. The second tube 16 is also heated toward the middle part, and both ends are rotated in mutually reverse direction so that the tube is twisted in the middle, where it is fused into an isolator 12 that blocks the path of the discharge tube and separate the discharge path of the second tube 16.

The third tube 20 is a round straight glass tube with its diameter slightly larger than that of the second tube 16. The phosphor layer 18 is formed on the inner layer surface of the third tube 20 and also on the inner and outer layer surface of the second tube 16.

The cathode 26 of the first tube 10 can be slid into each of the two discharge chambers of the second tube 16 to form a coaxial structure. The two cathodes 26 are formed at the outskirts of both ends of the second tube 16 and the third tube 20 in order to seal both ends of all discharge tubes. The sealing of both ends of all discharge tubes, along with the isolator 12 and the through-holes 14 e installed near the two sides of the isolator 12. Heating is performed at the outskirts of the two ends of the first tube 10 and the second tube 16, thus sealing both ends of the tubes. Then it is slid into the third tube 20 to form a coaxial structure, and heating is also part of the second tube 16, form a succession of interconnected discharge chambers.

As mentioned above, heating at the outskirts of the circumference at both ends of the first tube 10, the second tube 16, and the third tube 20, can soften, melt, and seal both ends of all of the discharge tubes. Also, a cap 36 that fits in with the two ends of all discharge tubes can be attached to each end of the multi-tube structure. By heating the can 36, the ends of the first tube 10, the second tube 16, and the third tube 20 can be melted and sealed, thus forming a succession of interconnected discharge chambers.

Assemblies with more than 5 tubes can be formed with the method mentioned above. Suppose the number of total tubes is N (N is an odd number), and each tube has a different diameter from the others. The isolator 12 can be formed around the middle that extends from the second tube 16 to the (N-1)th tube. The plural-numbered through-holes 14 can be formed around the ends of the even-numbered tubes from the second tube 16 to the (N-1)th tube, and also on both sides of the isolator 12 on the odd-numbered tubes from the third tube 20 to the (N-2)th tube.

In there, the phosphor layer 18 is coated on the inner and outer layer surface of the tubes from the second tube 16 to the (N-1)th tube, on the outer surface of the tube on the first tube 10, and also on the inner surface of the Nth tube. A pair of electrode 28 on the cathode 26 is connected with terminals 42 on the base 40 at each end.

Figure 19:
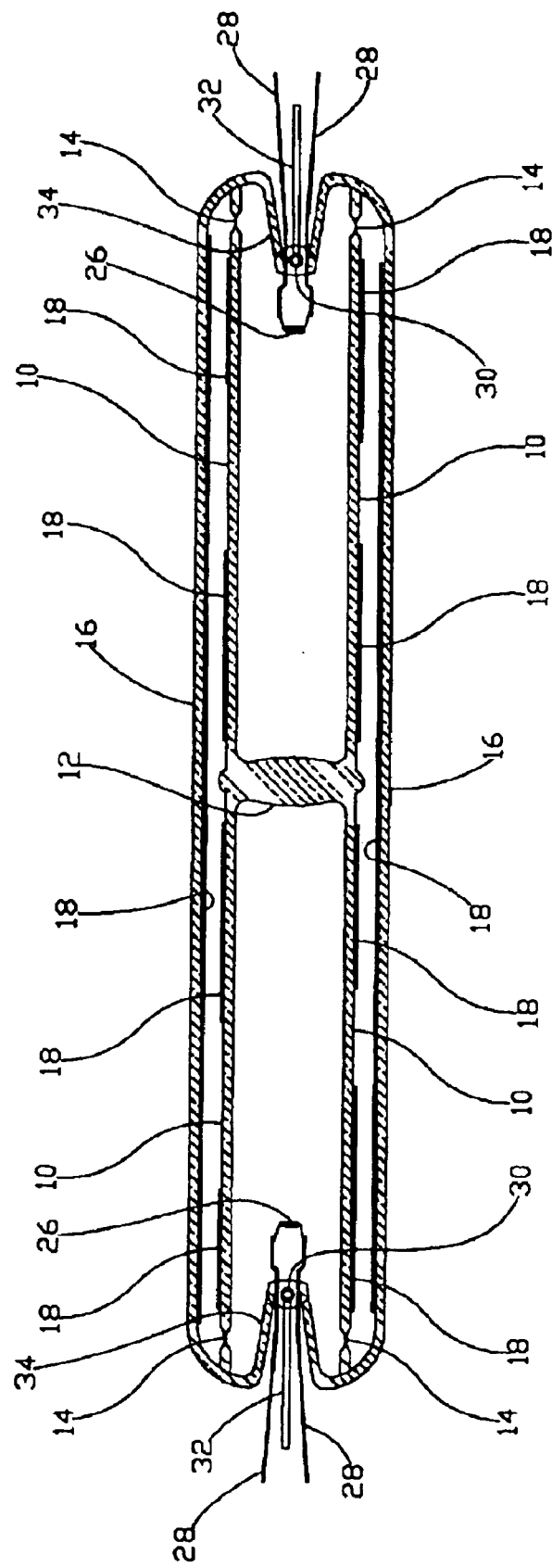
FIG. 19 is a cross-sectional view of a dual-tube fluorescent discharge lamp of a fourth embodiment.

According to FIG. 19, the first tube 10 is a round straight glass tube. Heating is performed toward the middle of the first tube 10, and rotation is made at both ends of the first tube 10 in mutually reverse direction. The softened part of the tube is twisted and fused into an isolator 12 that blocks the pipeline of the first tube 10 and forms two discharge chambers. Then, air is blown in from both ends of the said tube and heating is performed at several spots around the ends, resulting in the plural-numbered through-holes 14. A phosphor layer 18 is formed on the outer surface of said tube.

A second tube 16 is a round straight glass tube with a diameter slightly larger than that of the first tube 10 and a phosphor layer on the inner surface of the second tube 16. The first tube 10 is slid into the second tube 16 to form a coaxial structure. Besides, a pair of stems 34 is structured with a cathode 26, a pair of electrodes 28, a hole 30, and a pipe 32. Each of the two discharge chambers of the first tube 10 contains a cathode 26. Heating is performed at the outskirts of both ends of the first tube 10 and the second tube 16 so as to melt and seal both ends of the first tube 10 and the second tube 16 together with the stem 34. The isolator 12, the through-holes 14 of the first tube 10, and the sealing of both ends of all discharge tubes conspire to form a succession of interconnected discharge chambers.

Assemblies with more than 4 tubes can be formed with the method mentioned above. Let's say the number of total tubes is N (N is an even number), and each tube has a different diameter from the others. The isolator 12 can be formed around the middle that extends from the first tube 10 to the (N-1)th tube. The plural-numbered through-holes 14 can be formed on both sides of the isolator 12 on the odd-numbered tubes from the first tube 10 to the (N-1)th tube, and also around the ends of the even-numbered tubes from the second tube 16 to the (N-2)th tube. Also, a cap 36 on the stem 34 is attached to each end of the multi-tube, and heating is performed on the spots of the cap 36 that meet the assembled discharge tubes. This way, both ends of all the tubes can be melted and sealed. Therein, the phosphor layer 18 is applied on the inner and outer surfaces of the tubes from the second tube 16 to the (N-1)th tube, on the outer surface of the first tube 10, and also on the inner surface of the Nth tube. A pair of electrodes 28 on the cathode 26 is connected to terminals 42 on the base 40 at each end.

Figure 20:
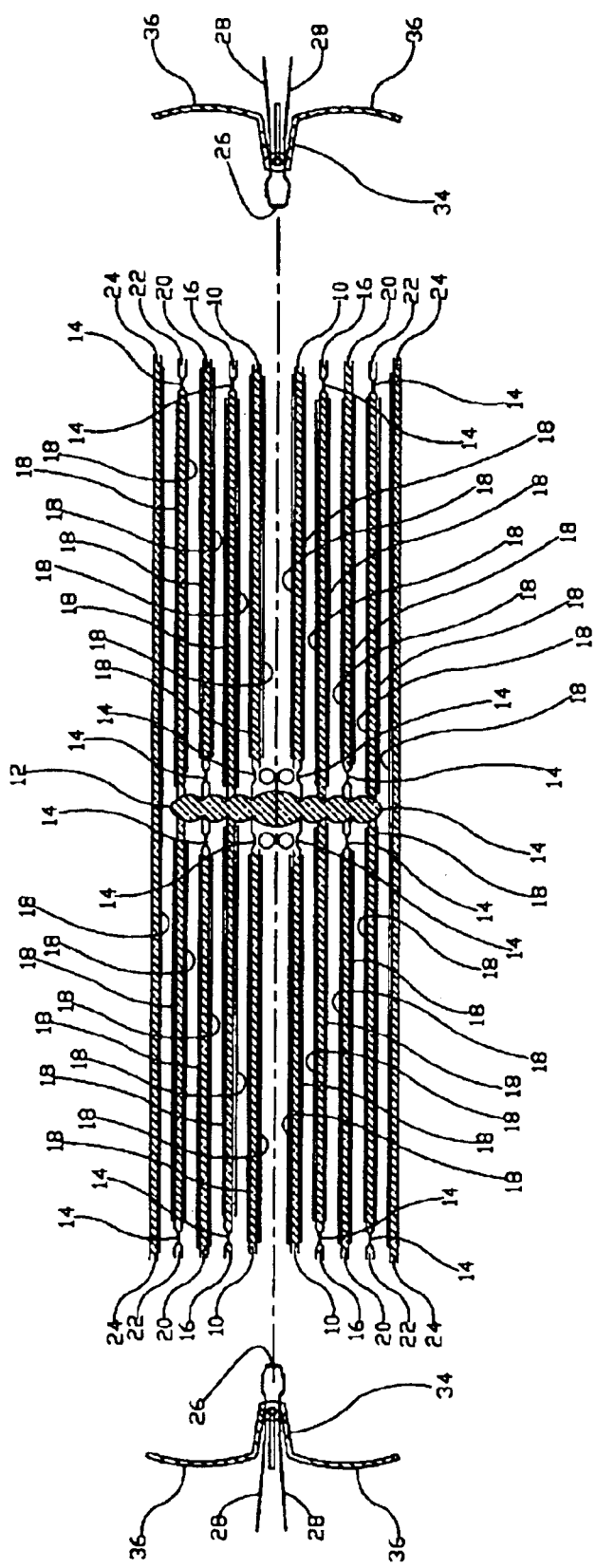
FIG. 20 is a cross-sectional view showing a five-tube portion and a pair of electrode portions of the five-tube fluorescent discharge lamp of the second embodiment.

Refer to FIG. 20 FIG. 10. The pair of stems 34 in FIG. 20 is structured with a cathode 26, a pair of electrodes 28, and a cap 36. The cathode 26 is assembled in each of the two discharge chambers of the first tube 10. The outer diameter of the cap 36 is the same as that of the fifth tube 24. The cap 36 is attached to each end of the first tube 10, the second tube 16, the third tube 20, the fourth tube 22, and the fifth tube 24. Heating at the points where the two cans 36 meet all of the discharge tubes can seal both ends of all the tubes. With the isolator 12, the through-holes 14, and the sealing of both ends of all the discharge tubes, a succession of interconnected discharge chambers can be formed.

Assemblies with more than 5 tubes can be formed with the method mentioned above. Let's say the number of total tubes is N (N is an odd number), and each tube has a different diameter from the others. The isolator 12 can be formed around the middle that extends from the first tube 10 to the (N-1)th tube. The plural-numbered through-holes 14 can be formed around the ends of the even-numbered tubes from the second tube 16 to the (N-1)th tube, and also on both sides of the isolator 12 on the odd-numbered tubes from the first tube 10 to the (N-2)th tube. Therein, the phosphor layer 18 is applied on the inner and outer surfaces of the tube from the first tube 10 to the (N-1)th tube, and also on the inner surface of the Nth tube. A pair of electrodes 28 on the cathode 26 is connected to terminals 42 on the base 40 at each end.

Compare FIG. 21 with FIG. 17. A base 40 with a pair of terminals 42 is attached to each of the two ends of the three-tube fluorescent discharge lamp. The electrodes 28 of the cathode 26 are welded to the said terminals 42 one to one.

As illustrated in FIG. 22, when negative HV is present at one of the electrodes 26 in one side of the first discharge tube 10, electrons released from the electrode are attracted by the positive HV at the other electrode 26 in the other side of the discharge tube 10. The electrons move into the second discharge tube 16 via the through-holes 14 of the first discharge tube 10, and then travel into the third discharge tube 20 via the through-holes 14 of the second discharge tube 16. The electrons that pass through the third discharge tube 20 will enter the second discharge tube 16 at the other end via the through-holes 14 of the second discharge tube and go on into the adjacent first discharge tube 10 via the through-holes 14 of the first discharge tube 10. Here, the electrons hit the other electrode 26. The positive of the electrode 26 are converted into negative ones during the next half cycle of the alternating current. At the other end of the discharge tube 10 with negative, the released electrons travel in the same manner, but in reverse direction, alone the route of the electron movement in the first half cycle, and arrive in time at the counterpart electrode 26 with positive charges. Meanwhile, the electronic ions and ultraviolet rays are excited by the discharge chamber of each discharge tube, causing the phosphor on the surface of each discharge tube to emit light.

Figure 23:
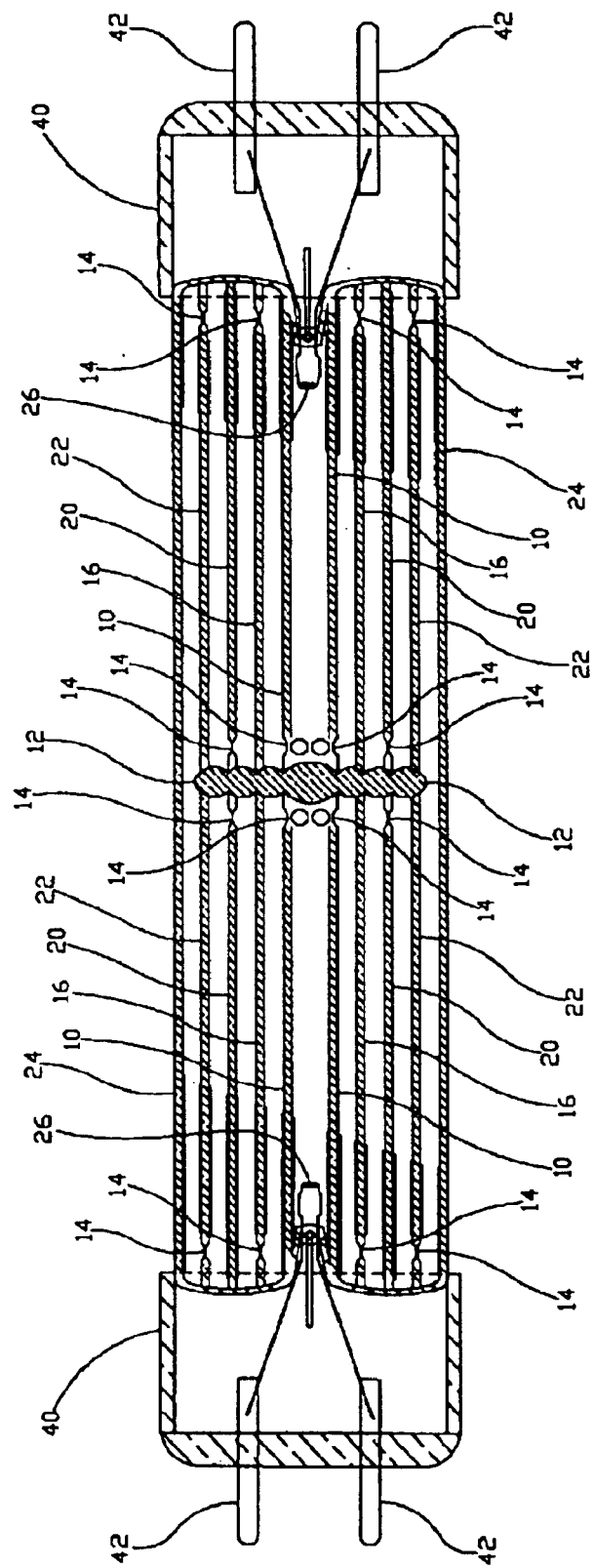
FIG. 23 is a cross-sectional view of the full schematic five-tube fluorescent discharge lamp of the second embodiment.

Similarly in FIG. 23, when negative HV is present at one of the electrodes 26 in one side of the first discharge tube 10, the electrons released from the electrode are attracted by the positive HV at the other electrode 26 in the other side of the first discharge tube 10. The electrons move into the second discharge tube 16 via the through-holes 14 of the first discharge tube 10, next travel into the third discharge tube 20 via the through-holes 14 of the second discharge tube 16, then into the fourth discharge tube 22 by way of the through-holes 14 of the third discharge tube 20, and finally into the fifth discharge tube 24 by passing the through-holes 14 of the fourth discharge tube 22. The electrons that passing through the fifth discharge tube 24 will enter the fourth discharge tube 22 at the other end via the through-holes 14 of the fourth discharge tube 22, then into the adjacent third discharge tube 20 from the through-holes 14 of the third discharge tube 20, next into the neighboring second discharge tube 16 via the through-holes 14 of the second discharge tube 16, and finally reaching the hugging first discharge tube 10 from through-hole 14 of the first discharge tube 10. Here, the electrons hit another electrode 26. The positive charges of the electrode 26 are converted into negative during the next half cycle of the alternating current. At the other end of the discharge tube 10 with negative, the released electrons travel in the same manner, but in reverse direction, along the route of the electron movement of the first half cycle, and arrive in time at the counterpart electrode 26 with positive. During this process, electronic ions and ultraviolet rays are excited by the discharge chamber of each discharge tube, causing the phosphor on the surface of each discharge tube to emit light.

Figure 24:
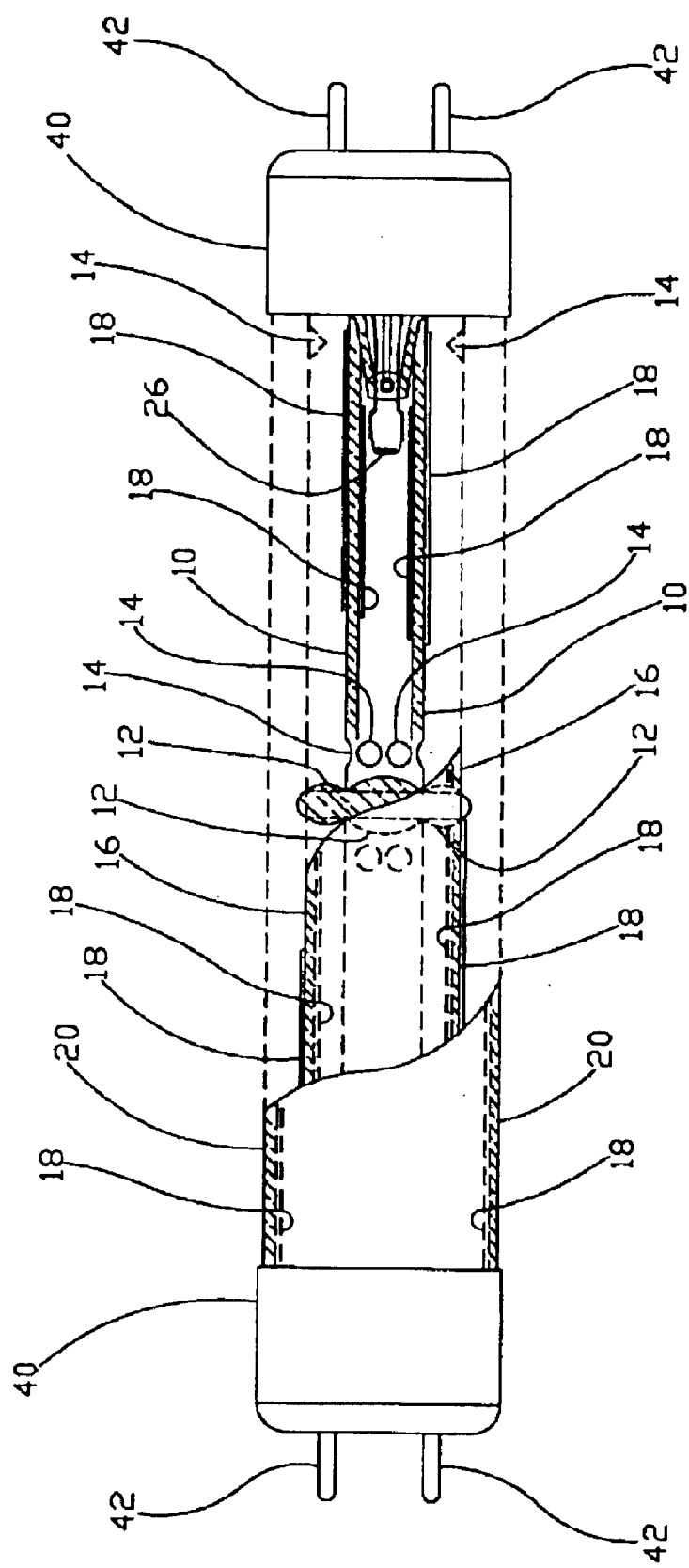
FIG. 24 is a partly broken and cross-sectional view of the full schematic three-tube fluorescent discharge lamp of the first embodiment.

FIG. 24 shows the relative positions of all the discharge tubes. The isolator 12 is formed near the middle across the first tube and the second tube. The cathode 26 is located in each of the two discharge chambers of the first tube 10. The plural-numbered through-holes 14 are formed around both sides of the isolator 12 of the first tube 10 and at both ends of the second tube 16. The phosphor layer 18 is coated on the inner and outer surfaces of the first tube 10 and the second tube 16, and also on the inner surface of the third tube 20. The paired electrodes 28 on the cathode 26 are connected with the terminals 42 on the base 40 at each end of the tube.

Figure 25:
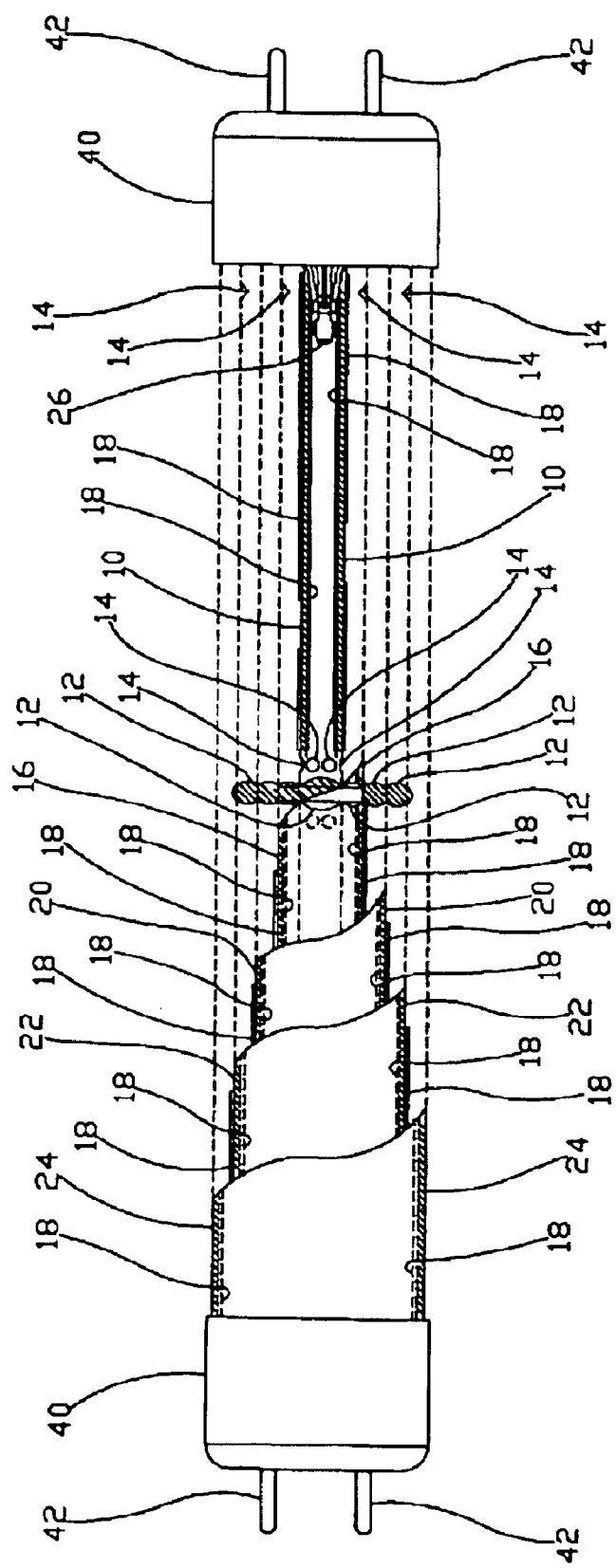
FIG. 25 is a partly broken and cross-sectional view of the full schematic five-tube fluorescent discharge lamp of the second embodiment.

FIG. 25 demonstrates a similar, though more complex, mapping of the relative positions of all the discharge tubes. The isolator 12 is formed near the middle across the first tube 10, the second tube 16, the third tube 20, and fourth tube 22. The cathode 26 is located in each of the discharge chambers of the first tube 10. The plural-numbered through-holes 14 are formed around both sides of the isolator 12 of the first tube 10 and of the third tube 20. Other plural-numbered through-holes 14 are created around both ends of the second tube 16 and of the fourth tube 22. The phosphor layer 18 is applied on the inner and outer surfaces of the first tube 10, the second tube 16, the third tube 20, and the fourth tube 22, and also on the inner surface of the fifth tube 24. A pair of electrodes 28 on the cathode 26 are connected with the terminals 42 on the base 40 at each end of the multi-tube.

Subsequently, the assembly of tubes is heated on the outside. Meanwhile, dry air is blown in from the pipe 32 at one end and exits through the pipe 32 at the other end so as to accelerate the drying process of the phosphor layers. After the drying process is completed, one of the pipes 32 is heated and sealed, and then several mg of mercury (Hg) is injected into the discharge chamber from the other pipe 32. What follows, the discharge chamber is vacuumed and then filled with a little Ar gas, such as several hundred Pa in pressure. Then the pipe 32 is sealed. Afterwards, the assembly of tubes is placed in an electromagnetic environment, such as a microwave chamber, to agitate the liquid Hg into vapor Hg. After high-voltage currents go through the two cathodes, a radiating glow will be generated in the discharge lamp.

What is claimed is:

1. Method of manufacturing a multi-tube fluorescent discharge lamp, wherein the finished lamp comprises a first glass tube, a second glass tube, which is slightly larger than the first glass tube; two cathode portions, and phosphor; said method comprising the steps of:
   a) forming an isolator nearby the middle of the first glass tube;
   b) perforating through-holes nearby the both ends of the first glass tube;
   c) coating phosphor on an outer surface of the first glass tube;
   d) coating phosphor on an inner surface of the second glass tube;
   e) installing two cathode portions, each includes a pair of electrodes, a pipe, a stem and a hole, at respective the both ends of the first glass tube;
   f) fusing the two ends of the first glass tube with the cathode portions;
   g) installing the first glass tube into the second glass tube in coaxial;
   h) fusing the two ends of the first glass tube and the second glass tube;
   i) drying the phosphor layer and sealing one of the pipe by heat;
   j) injecting Hg as several mg into the discharge chamber from the other opening pipe;
   k) vacuuming the discharge chamber front the other opening pipe;
   l) filling Ar gas as several hundreds Pa in pressure into the discharge chamber;
   m) sealing the other opening pipe;
   n) agitating the liquid Hg into vapor Hg;
   o) installing two bases to respective ends of the discharge tube.

2. Method of manufacturing a multi-tube fluorescent discharge lamp, wherein the finished lamp comprises a first glass tube, a second glass tube, which is slightly larger than the first glass tube; a third glass tube, which is slightly larger than the second glass tube; two cathode portions, and phosphor, said method comprising the steps of:
   a) forming an isolator nearby the middle of the first glass tube, two discharge chambers are formed;
   b) perforating through-holes nearby the both ends of the isolator of the first glass tube;
   c) perforating through-holes nearby the both ends of the second glass tube;
   d) installing the first glass tube into the second glass tube in coaxial;
   e) forming an isolator nearby the middle of the second glass lube correspond to the isolator of the first tube, two discharge chambers are formed;
   f) coating phosphor on an outer and inner surface of the first glass tube and second glass tube;
   g) coating phosphor on the inner surface of the third glass tube;
   h) installing two cathode portions, at respective the both ends of the first glass tube;
   i) fusing the two ends of the first glass tube with the cathode portions
   j) installing the combination of the first glass tube and second glass tube into the third glass tube in coaxial;
   k) fusing the two ends of all glass tubes;
   l) drying the phosphor layer and sealing one of the pipe by heat;
   m) injecting Hg as several mg into the discharge chamber from the other opening pipe;
   n) vacuuming the discharge chamber from the other opening pipe;
   o) filling Ar gas as several hundreds Pa in pressure into the discharge chamber;
   p) sealing the other opening pipe;
   q) agitating the liquid Hg into vapor Hg;
   r) installing two bases to respective ends of the discharge tube.

3. The method of claim 1 or 2, wherein said the isolator of the first glass tube is performed by heating toward the middle of the first glass tube, and rotation is made at both ends of the first glass tube in mutually reverse direction, the softened part of the tube is twisted and fused into an isolator that blocks the pipeline of the first tube and forms two discharge chambers.

4. The method of claim 1, wherein said the through-holes of the first glass tube are performed by blowing the air in from both ends of the first glass tube, also heating is performed at several spots around the ends, resulting in the plural-numbered through-holes.

5. The method of claim 2, wherein said the through-holes of the first glass tube is performed by blowing air into the first glass tube from both ends, and heating is performed at several points around the two sides of the isolator, the plural-numbered through-holes 14 are formed.

6. The method claim 2, wherein said the through-holes of the second glass tube is performed by blowing into the second glass tube from both ends, and heating is performed at several spots around both ends of the tube, the plural-numbered through-holes are formed.

7. The method of claim 2, wherein said the isolator of the second glass is performed by heating around the second glass tube, at a place that corresponds to the position of the isolator in the first glass tube, and then rotation is made at both ends of the second glass tube in mutually reverse direction, the heated, softened middle part of the tube is fused with the first glass tube into another isolator that blocks the pipeline of the second glass tube and separates the discharge path of the second tube into two discharge chambers.

8. Method of manufacturing a multi-tube fluorescent discharge lamp, wherein the finished lamp comprises a first glass tube, a second glass tube, which is slightly larger than the first glass tube; a third glass tube, which is slightly larger than the second glass tube; two cathode portions, and phosphor, said method comprising the steps of:

a) installing two cathode portions, each includes a pair of electrodes, a pipe, a stem and a hole, at respective the both ends of the first glass tube;

b) forming an isolator nearby the middle of the second glass tube, two discharge chambers are formed;

c) perforating through-holes nearby the both ends of the second glass tube;

d) coating phosphor on an outer surface of the first glass tube;

e) coating phosphor on an inner and outer surface of the second glass tube;

f) coating phosphor on the inner surface of the third glass tube, which is slightly larger than the second glass tube;

g) installing the two first glass tubes into respective the two chambers of the second tube in coaxial;

h) fusing the two ends of the first glass tube and the second glass tube;

i) installing the combination of the first glass tube and the second glass tube into the third glass tube in coaxial;

j) fusing the two ends of all glass tubes;

k) drying the phosphor layer and sealing one of the pipe by heat;

l) injecting Hg as several mg into the discharge chamber from the other opening pipe;

m) vacuuming the discharge chamber from the other opening pipe filling Ar gas as several hundreds Pa in pressure into the discharge chamber;

n) sealing the other opening pipe;

o) agitating the liquid Hg into vapor Hg;

p) installing two bases to respective ends of the discharge tube.

9. The method of claim 8, wherein the first tube is a round straight glass tube, in which a pair of electrodes and one pipe with said tube are inserted to form a coaxial structure, one end of the first glass tube is heated for softening, and then clamped, pressed and sealed, the pair of electrodes and the pipe can be fixed, and air is blown into the pipe, by heating the sealed end, a hole can be produced for exhaust to pass through the pipe.

10. The method of claim 8, wherein said the through-holes of the second glass tube is performed by blowing air in from both ends of the second glass tube, or one end of the said tube is air tight and the air is blown in from the other end, heating is performed around several spots on both ends of the second glass tube, thus producing the plural-numbered through-holes.

11. The method of claim 8, wherein said the isolator of the second glass tube is performed by heating toward the middle part of the second glass tube, and both ends are rotated in mutually reverse direction so that the tube is twisted in the middle, where it is fused into an isolator that blocks the path of the discharge tube and separates the discharge path of the second glass tube.

* * * * *